May 13, 1952  F. F. JENKINS  2,596,490
PIPE AND METHOD OF MAKING SAME
Filed Aug. 10, 1948

INVENTOR
FRED F. JENKINS
BY
ATTORNEYS

Patented May 13, 1952

2,596,490

UNITED STATES PATENT OFFICE 2,596,490

PIPE AND METHOD OF MAKING SAME

Fred F. Jenkins, Lynwood, Calif., assignor to American Pipe and Construction Co., a corporation of Delaware Application August 10, 1948, Serial No. 43,386

7 Claims. (Cl. 138—66)

This invention relates generally to the art of making concrete pipe of the type having a steel reinforcement shell embedded in the concrete.

Concrete pipe is made with a steel shell for use in high-pressure water lines and other installations where the pipe must withstand high internal pressure. Such pipe is commonly made up of a steel shell having an inner lining of concrete or mortar, an outer reinforcement means for the shell, such as a wire rod wrapped around the shell, and an outer layer of mortar. The lining may be applied by spinning the same in the pipe so that a smooth dense lining is obtained. In the interests of economy of production and quality of product it is desirable to apply the outer coating of mortar by propelling or throwing the mortar onto the pipe at high velocity as the pipe is rotated. This necessitates using mortar which is relatively dry, that is mortar having a low water/cement ratio, so that it will remain in place on the pipe. Another consideration is the fact that to obtain maximum strength, the mortar should be relatively dry.

While the above considerations present no particular difficulty in the manufacture of the pipe, it has been found that the steel shell of pipe so formed has a tendency to rust beginning on its outer surface thereby greatly diminishing the effective life of the pipe for use in carrying high-pressure liquids.

An object of this invention is to provide a novel method of making steel shell pipe of the type described to produce a pipe in which the shell is protected against rusting and the life of the pipe is materially increased for its designed use. In this connection, it is a particular object to provide a method of making steel shell pipe which enables the use of a relatively dry outer layer of mortar and yet achieves a sealing of the steel shell to protect it against rusting.

Another object is to provide a new and improved composite pipe of the type indicated in which the shell is protected against oxidation.

A further object is to provide a method of making an improved steel shell pipe which readily lends itself to present methods of production.

These and other objects will be apparent from the drawing and the following description. Referring to the drawing, which is merely for illustrative purposes:

Figure 1:
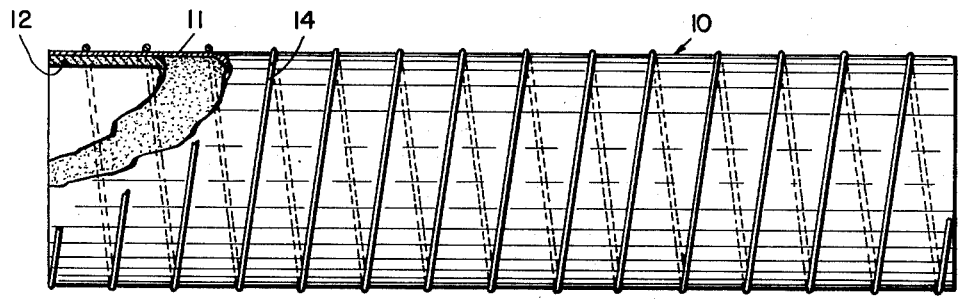
Fig. 1 is a fragmentary view in elevation and section of a partially completed pipe member.

As one example, and for purposes of illustration, in Fig. 1 there is shown a partially completed pipe member 10 consisting of a tubular cylindrical steel shell 11 which has been provided with an inner lining 12 of concrete or mortar. The shell is also shown as externally reinforced by a wire rod 14 which may be considered as having been wrapped around the shell under tension and secured thereto in such condition. It is to be understood, of course, that the method to be described may be used in connection with pipe formed with or without external reinforcing of the shell and without regard to the type of external reinforcing that may be used.

The partially completed pipe member of Fig. 1 is coated on its outer surface with a thin layer of hydraulic cement, preferably Portland cement, and water. While this coating is still wet the final or outer layer of mortar is applied to the pipe member. Preferably, the sealing coat of cement and water should consist of from 50% to 65% by weight of cement and the remainder water. This mix or coating material should be maintained agitated prior to application to insure an even distribution of cement and water as the coating is applied. Preferably, the coating is applied to the uncompleted pipe member by spraying and immediately thereafter the final or outer layer of mortar is applied.

The composition of the mortar may be varied but the water/cement ratio should be kept low. A mix comprising 3½ parts of sand to one part hydraulic cement with approximately 4 gallons of water per standard 96 pound sack of cement is especially suitable.

Figure 2:
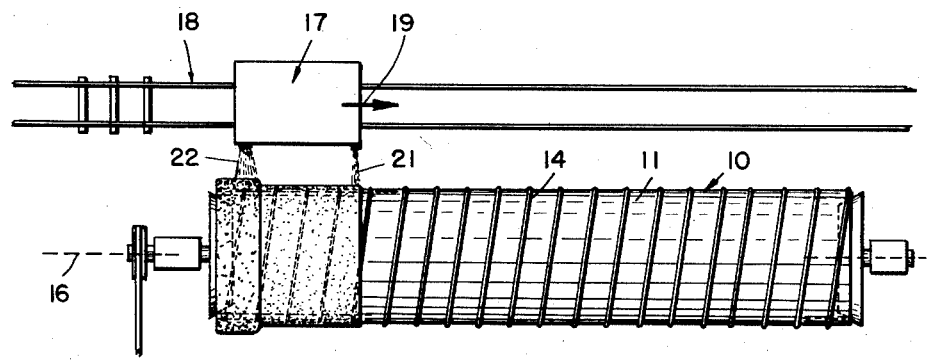
Fig. 2 is a diagrammatic view of the pipe member and apparatus for completing the same.

As an example and as a preferred method of applying the sealing coat and the outer layer, in Fig. 2 the uncompleted pipe member 10 is supported in any suitable manner for rotation about its longitudinal axis indicated by 16. This pipe member is rotated and the two coatings progressively applied from one end of the pipe to the other. This may be accomplished by using a machine 17 operable on a track 18 extending parallel to the axis of the pipe. The machine throws or propels the sealing coat mixture or wash 21 of cement and water onto the pipe member 10 as the machine progresses in the direction of arrow 19. This may be done by using compressed air as the motivating force. Immediately behind this, the mortar coating 22 is propelled onto the pipe. One method of doing this is by feeding the mortar to a pair of rapidly rotating brushes which throw the mortar onto the pipe thereby compacting the same as it hits the pipe with considerable force.

Figure 3:
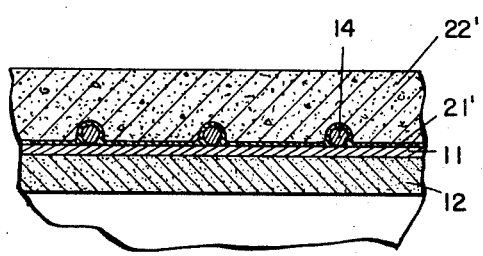
Fig. 3 is an enlarged sectional view of a fragmentary portion of a completed pipe.

The resulting product is illustrated in Fig. 3 wherein the protective sealing coat is indicated by numeral 21' and the outer mortar layer by the numeral 22'. Tests have shown that the sealing coat effectively protects the steel shell against rusting by providing a thin, dense layer which effectively prevents oxidizing agents from reaching the shell.

Although the invention has been particularly set forth it is contemplated that various modifications may be made without departing from the scope of the invention which is defined in the claims.

I claim:

1. In a method of making steel shell concrete pipe, the steps of providing a pipe member comprising a steel shell having a concrete inner lining, coating the outer surface of said shell with a cement wash comprising hydraulic cement and water and applying a layer of mortar composed of sand, hydraulic cement and water having a low water/cement ratio over said wash coating while the same is wet.

2. In a method of making steel shell concrete pipe, the steps of providing a pipe member comprising a steel shell having a concrete inner lining, coating the outer surface of said shell with a cement wash comprising from 50% to 65% by weight of hydraulic cement and the remainder water, and applying a layer of mortar composed of sand, hydraulic cement and water having a low water/cement ratio over said wash coating while the same is wet.

3. In a method of making steel shell concrete pipe, the steps of providing a pipe member comprising a steel shell having a concrete inner lining, coating the outer surface of said shell with a cement wash consisting of approximately 50% by weight of hydraulic cement and 50% by weight of water, and applying a layer of mortar composed of sand, hydraulic cement and water having a low water/cement ratio over said wash coating while the same is wet.

4. A composite concrete steel shell pipe comprising a steel shell having an inner lining of concrete, a thin coating of neat hydraulic cement on the exterior of said shell, and a layer of hydraulic cement mortar over said coating, said mortar originally having had a low water/cement ratio.

5. The method of providing a protective and reinforcement body of concrete on a steel surface which comprises coating said surface with a cement wash consisting of about 50% to 65% by weight of hydraulic cement and the remainder water, and applying a layer of mortar over the wash while the same is wet, said mortar comprising chiefly sand, hydraulic cement and water with a relatively low water/cement ratio.

6. The method of providing a protective and reinforcement body of concrete on a steel surface which comprises coating said surface with a cement wash consisting of about 50% to 65% by weight of hydraulic cement and the remainder water, and applying a layer of mortar over the wash while the same is wet, said mortar comprising chiefly sand, hydraulic cement and water in the approximate proportions of 3½ parts sand to 1 part cement with about 4 gallons of water per 96 pounds of cement.

7. In a method of making steel shell concrete pipe, the steps of providing a pipe member comprising a steel shell having a concrete inner lining, coating the outer surface of said shell with a cement wash comprising from 50% to 65% by weight of hydraulic cement and the remainder water, rotating the pipe member and forcibly propelling a layer of mortar onto said wash coating while the same is wet, said mortar comprising chiefly sand, hydraulic cement and water having a low water/cement ratio.

FRED F. JENKINS.

REFERENCES CITED

The following references are of record in the file of this patent:

UNITED STATES PATENTS

| Number | Name | Date |
| --- | --- | --- |
| 969,692 | Henderson | Sept. 6, 1910 |
| 1,678,980 | Gardiner | July 31, 1928 |
| 2,045,671 | Ogee | June 30, 1936 |
| 2,053,307 | Wilson | Sept. 8, 1936 |